United States Patent
Huang (10) Patent No.: US 6,378,024 B1
(45) Date of Patent: Apr. 23, 2002

(54) REDUCED MICROPROCESSOR APPARATUS AND METHOD FOR DEVICE CONTROL SYSTEM USING IMPEDANCE ISOLATING EXPANSION CIRCUIT

(75) Inventor: Qiang Huang, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/259,903

(22) Filed: Feb. 26, 1999

(51) Int. Cl.$^7$ ............................................. G06F 13/00
(52) U.S. Cl. ............................ 710/300; 710/2; 348/552
(58) Field of Search ................................. 710/101, 102, 710/103, 1, 2, 62, 63, 126, 129, 300, 301, 305, 306, 313, 315

(56) References Cited

U.S. PATENT DOCUMENTS

| | | | | |
|---|---|---|---|---|
| 4,916,626 A | * | 4/1990 | Vermesse | 714/718 |
| 5,721,838 A | * | 2/1998 | Takahashi et al. | 710/103 |
| 5,887,144 A | * | 3/1999 | Guthrie et al. | 710/101 |
| 5,892,982 A | * | 4/1999 | Mitsuda et al. | 710/62 |
| 5,898,844 A | * | 4/1999 | Thompson | 361/58 |

OTHER PUBLICATIONS

"The I2C bus and how to use it (including specifications)"; Philips Semiconductors; 4/95; pp. 1–6.*

* cited by examiner

Primary Examiner—Robert Beausoleil
Assistant Examiner—X. Chung-Trans
(74) Attorney, Agent, or Firm—Wagner Murabito & Hao LLP (57) ABSTRACT

A method and apparatus for having a reduced number of controlling system microprocessors in a device. In one embodiment, the present invention includes a single main system microprocessor. This embodiment further includes an impedance isolating expansion circuit. The single main system microprocessor and the impedance isolating expansion circuit are coupled together using a bus. In this embodiment, the bus has a plurality of components coupled thereto. Additionally, in the present embodiment, a plurality of second components are coupled to the impedance isolating expansion circuit such that the plurality of second components are not directly connected to the bus and such that the plurality of second components do not induce a direct impedance load on the bus. By prohibiting the second components from inducing a direct impedance load on the bus, the present invention allows the single main system microprocessor to operate effectively and without severe signal distortion. As a result, a single main system microprocessor is able to control operation of a device with reliability and stability even when the device includes numerous components.

21 Claims, 6 Drawing Sheets

REDUCED MICROPROCESSOR APPARATUS AND METHOD FOR DEVICE CONTROL SYSTEM USING IMPEDANCE ISOLATING EXPANSION CIRCUIT

TECHNICAL FIELD

The present invention generally pertains to the field of consumer electronic devices. More particularly, the present invention is related to a consumer electronics device having a single main system microprocessor.

BACKGROUND ART

Figure 1:
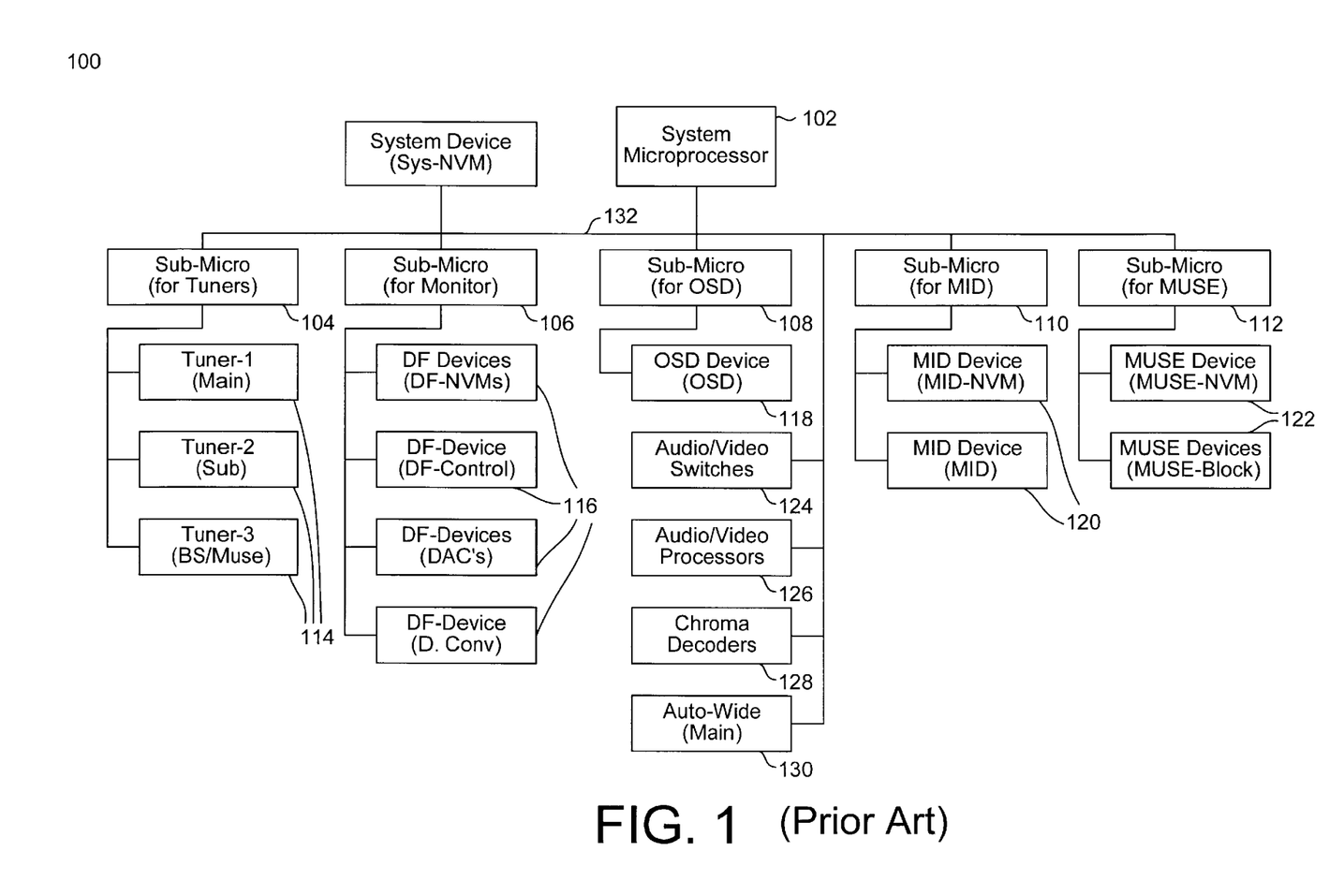
FIG. 1 is a schematic diagram of an exemplary conventional HDTV system having several microprocessors.

Due, in part, to the rapid development of semiconductor and VLSI (very large-scale integrated circuit) technologies in recent years, consumer electronics products have become increasingly popular. These now popular consumer electronics products include, for example, televisions (TVs), high definition televisions (HDTV), digital video disc (DVD) players, and the like. In addition to gaining popularity, such devices are also becoming increasingly technologically advanced. For example, Prior Art FIG. 1, illustrates several of the advanced components found in a conventional HDTV system 100. As shown in Prior Art FIG. 1, HDTV system 100 includes a system processor 102 which is coupled to and which controls five separate sub-microprocessors sub micro 104, sub micro 106, sub micro 108, sub micro 110, and sub micro 112. Each of the five sub micros 104, 106, 108, 110 and 112 controls numerous other HDTV components. For example, sub micro 104 controls tuner operation including tuner components 114. Similarly, sub micro 106 controls HDTV monitor deflection operation via components 116. Sub micro 108 controls on-screen display (OSD) functions with OSD device 118. Additionally, sub micro 110 controls multi-image drivers (MID) with components 120. Furthermore, sub micro 112 controls MUSE (Japanese HDTV standard) functions with components 122. It will also be seen from Prior Art FIG. 1, that various other components (e.g. audio/video switches component 124, audio/video processors component 126, chroma decoders component 128, and auto-wide component 130) are coupled to system microprocessor 102 via bus line 132 without an intermediary controlling sub-microprocessor.

The conventional multi-processor architecture of Prior Art FIG. 1 has several disadvantages associated therewith. Such disadvantages include, for example, substantial design complexity and increased costs resulting from the use of multiple microprocessors. Thus, some attempt has been made to design a consumer electronics product (e.g. a TV, an HDTV, a DVD, and the like) using only a single controlling microprocessor. Such a single microprocessor-controlled system not only reduces the system complexity and cost, but also increases the integration of system control functions. However, prior art single microprocessor-controlled systems often demand a powerful system microprocessor with a very strong driving capability. The requirement for a microprocessor with a very strong driving capability necessitates the use of a more powerful, and correspondingly more expensive, microprocessor. Thus, some prior art single microprocessor-controlled systems may be nearly as expensive as conventional systems having multiple microprocessors.

As yet another drawback, conventional control schemes used in multi-microprocessor controlled systems may not be suitable for single microprocessor-controlled system designs. In many prior art single microprocessor-controlled systems, signal distortion is a significant problem. Signal distortion associated with prior art single microprocessor-controlled systems is typically caused by either insufficient driving capability of the single system microprocessor, or by having too many devices connected to control bus lines. The signal distortion, in turn, reduces the reliability and stability of the system controls, which are vital in the overall performance of most consumer electronics products. Additionally, signal distortion will also limit the integration of subsystems with the single microprocessor-controlled device.

Thus, a need exists for a method and apparatus having a reduced number of system microprocessors in a device. A further need exists for a method and apparatus which meets the above-listed need and wherein the device does not impose prohibitively high driving requirements on the system microprocessor. Still another need exists for a method and apparatus which meets both of the above-listed needs and wherein the device does not suffer from severe signal distortion.

DISCLOSURE OF THE INVENTION

The present invention provides a method and apparatus having a reduced number of system microprocessors in a device. Additionally, the present invention provides a method and apparatus which achieves the above-listed accomplishment and wherein the device does not impose prohibitively high driving requirements on the system microprocessor. The present invention further provides a method and apparatus which achieves both of the above-listed accomplishments and wherein the device does not suffer from severe signal distortion.

In one embodiment, the present invention includes a single main system microprocessor. This embodiment further includes an impedance isolating expansion circuit. The single main system microprocessor and the impedance isolating expansion circuit are coupled together using a bus. In the present embodiment, a plurality of components are coupled to the impedance isolating expansion circuit such that the plurality of components are not directly connected to the bus and such that the plurality of components do not induce a direct impedance load on the bus. By prohibiting the components from inducing an impedance load on the bus, the present invention allows the single main system microprocessor to operate effectively and without severe signal distortion. In this embodiment, the bus has a plurality of second components coupled thereto. As a result, a single main system microprocessor is able to control operation of a device with reliability and stability even when the device includes numerous components.

In another embodiment, the present invention includes the features of the above-described embodiment and further recites that the bus used to couple the single main system microprocessor to the impedance isolating expansion circuit is an I$^2$C bus. Similarly, other embodiments include the aforementioned features and recite that the first components are coupled to the impedance isolating expansion circuit using an I$^2$C bus.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 2:
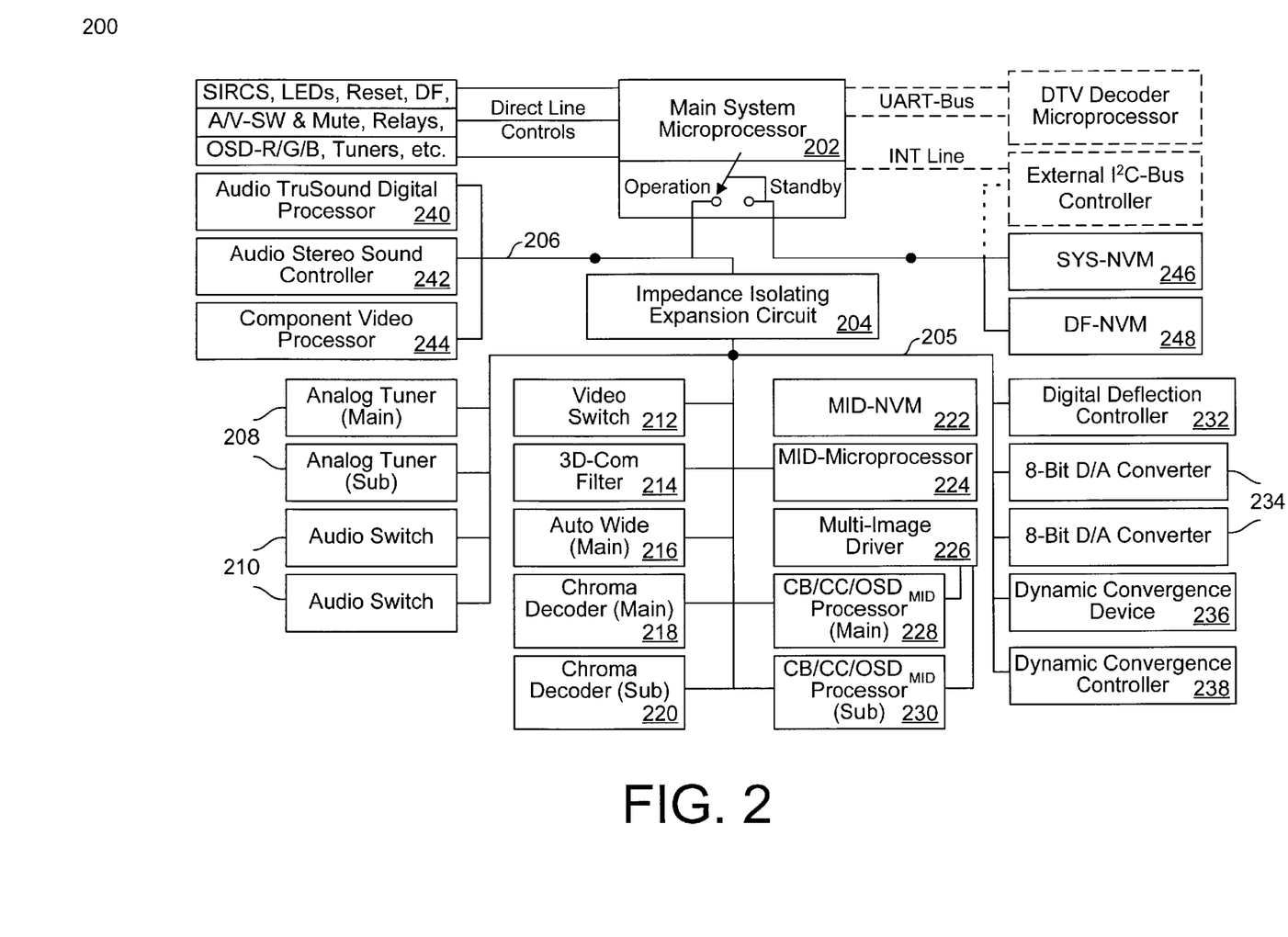
FIG. 2 is a schematic diagram of one embodiment of an HDTV system having a single main system microprocessor in accordance with one embodiment of the present claimed invention.

With reference now to FIG. 2, a schematic diagram of one embodiment of an HDTV system 200 having a single main system microprocessor in accordance with one embodiment of the present invention is shown. Although the following discussion will specifically refer to HDTV system 200, such an embodiment is an example of one type of consumer electronics product to which the present invention is well suited. That is, the single main system microprocessor architecture of the present invention is well suited to use in various other consumer electronic products such as, for example, TVs, DVDs, and the like. For purposes of brevity and clarity, the following discussion will focus on the HDTV system 200 embodiment of the present invention. In the embodiment of FIG. 2, HDTV system 200 includes a single main system microprocessor 202. That is, unlike conventional devices (see e.g. Prior Art FIG. 1), the present embodiment has only one main system microprocessor for controlling the operation of HDTV system 200.

Referring still to FIG. 2, system 200 of the present embodiment further includes an impedance isolating expansion circuit 204. Impedance isolating expansion circuit 204 is coupled to single main system microprocessor 202 by a bus 206. As shown in FIG. 2, numerous components are coupled to impedance isolating expansion circuit 204. In the present embodiment, a bus 205 is used to couple impedance isolating expansion circuit to the aforementioned numerous components. The numerous components include, for example: analog tuners 208; audio switches 210; video switch 212; 3D-com filter 214; auto wide main 216; chroma decoders 218 and 220; MID devices 222, 224, 226, 228, and 230; digital deflection controller 232; digital-to-analog converters 234; and dynamic convergence components 236 and 238. Hence, in the present invention the numerous aforementioned components are not directly connected to bus 206. That is, unlike prior art architectures, in the present invention, impedance isolating expansion circuit 204 eliminates the direct connection of multiple components to the bus to which main system microprocessor 202 is coupled. As a result, impedance isolating expansion circuit 204 prevents numerous components 208–238 from inducing a direct impedance load on bus 206. Thus, unlike prior art single processor devices, single main system microprocessor 202 of the present embodiment does not have a prohibitively high driving requirement placed thereon. Hence, in the present invention, impedance isolating expansion circuit 204 prevents numerous components 208–238 from inducing a direct impedance load on bus 206, and impedance isolating expansion circuit eliminates the need for a more powerful, and correspondingly more expensive, single main system microprocessor 202. Also, although specific components, 208–238 are recited in the present embodiment, the present invention is well suited to having various other quantities and/or types of components coupled to impedance isolating expansion circuit 204.

With reference still to FIG. 2, in the present embodiment, several additional components 240, 242, and 244 are coupled directly to bus 206. Additional components 246 and 248 are also coupled to single main system microprocessor 202 in this embodiment. Although directly coupled to bus 206, components 240–244 do not induce a significant impedance load on bus 206. Thus, the embodiment of FIG. 2 does not necessitate the use of a more powerful, and correspondingly more expensive, microprocessor. Hence, by selectively coupling some components 240–244 directly to bus 206, and by coupling other components 208–238 to impedance isolating expansion circuit 204, all of components 208–238 and components 240–244 can be controlled by single main system microprocessor 202, without the deleterious consequences associated with prior art single microprocessor-controlled systems. Furthermore, although additional components 240–244 are coupled directly to bus 206 in the present embodiment, the present invention is also well suited to an embodiment in which no components are directly coupled to the bus (e.g. bus 206 of the embodiment of FIG. 2) coupling single main system microprocessor 202 to impedance isolating expansion circuit 204.

Still referring to FIG. 2, in the present embodiment bus 206 is an $I^2C$ bus. Similarly, in the embodiment of FIG. 2, bus 205 is an $I^2C$ bus. Although such buses are used in the present embodiment, the present invention is well suited to embodiments in which either or both of buses 205 and 206 are other than I²C-type buses. Furthermore, in embodiment of FIG. 2, impedance isolating expansion circuit 204 is an I²C bus IC chip circuit such as, for example, I²C bus IC chip circuit 82B715 available from Philips Semiconductors of Sunnyvale, Calif. Again, the present invention is also well suited to the use of other circuits which isolate single main system microprocessor 202 from component induced impedance.

Referring still to FIG. 2, in an embodiment utilizing an I²C bus (e.g. buses 205 and 206) and an I²C bus expansion circuit (e.g. impedance isolating expansion circuit 204), several additional factors must be considered. That is, in addition to isolating single main system microprocessor 202 from impedance induced by components 208–238 and 240–244, certain other operating parameters must be achieved. For example, in such an embodiment, the capacitance load on any part of I²C bus lines must not exceed 400 pF. Thus, care must be taken in such an embodiment to ensure impedance isolating expansion circuit 204 does not have too many components coupled thereto. In one embodiment, an additional I²C bus expansion circuit is used. In such an embodiment, the second I²C bus expansion circuit has some of the components coupled thereto to spread component induced capacitance loads. Also, in an embodiment utilizing an I²C bus (e.g. buses 205 and 206) and an I²C bus expansion circuit (e.g. impedance isolating expansion circuit 204),currents on pull-up resistors $R_2$ (see following discussion of FIGS. 3 and 4) cannot exceed 30 milliAmperes.

Figure 3:
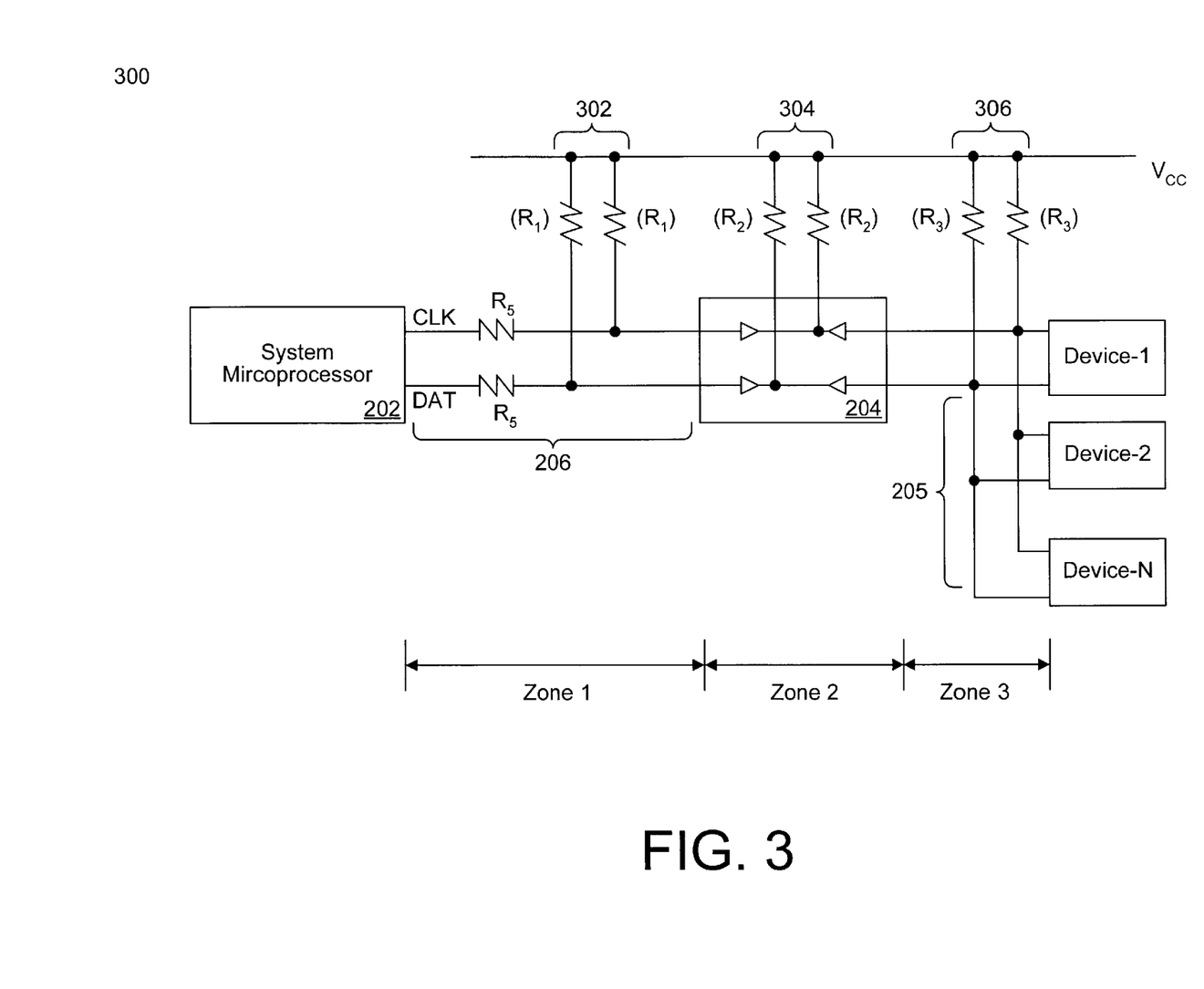
FIG. 3 is a schematic diagram of an embodiment in which no components are directly connected to a bus coupling an impedance isolating expansion circuit and a single main system microprocessor in accordance with one embodiment of the present claimed invention.

Referring next to FIG. 3, a simplified schematic view of one embodiment 300 of the present invention is shown in which single main system microprocessor 202 is coupled to an I²C bus expansion circuit 204 via an I²C bus 206. In the embodiment of FIG. 3, no components other than I²C bus expansion circuit 204 are directly coupled to I²C bus 206. As shown in the embodiment of FIG. 3, multiple components (e.g. integrated circuit devices) labeled as device 1 through device N are coupled to I²C bus expansion circuit 204 via I²C bus 205. In the embodiment of FIG. 3, three pull-up resistors 302, 304, and 306 are shown coupled to I²C bus 206, I²C bus expansion circuit 204, and I²C bus 205, respectively. In the present embodiment, the values for resistors 302, 304, and 306 must be properly selected. That is, resistors 302, 304, and 306 must be of a value such that the required time-constants on I²C buses 205 and 206 and on I²C bus expansion circuit 204 can be guaranteed.

The following discussion presents, in detail, one method for deriving the appropriate values for resistors 302, 304, and 306. System 300 of FIG. 3 is partitioned into three zones to clarify the resistor value calculations for the present embodiment. Zone 1 includes capacitance values associated with single main system microprocessor 202 and I²C bus 206; Zone 2 includes capacitance values associated with circuitry inside I²C bus expansion circuit 204; and Zone 3 includes capacitance values associated with I²C bus 205 and the components coupled thereto (i.e. devices 1–N). In the following calculations, the input capacitance associated with devices 1–N is estimated to be, on average, 5–10 pF. Additionally, $C_1$ refers to the capacitance present on I²C bus 206. Thus, the calculations for $R_1$, $R_2$, and $R_3$ in system 300 are as follows:

In Zone-1:
$R_1 = 10^{-6}/(C_1 \ast 10^3)$ (kΩ),
$C_1 = C_{1-mci} + C_{1-mcw} + C_{1-expd}$ (F)
where $C_{1-mci}$ is the capacitance contributed by the input of single main system microprocessor 202 for zone 1; $C_{1-mcw}$ is the capacitance contributed by the wiring of single main system microprocessor 202 for zone 1; and $C_{1-expd}$ is the capacitance contributed by I²C bus expansion circuit 204 for zone 1.

In Zone-2:
$R_2 = 1/(1/R'_2 + 10 \ast (1/R_1 + 1/R_3))$ (kΩ),
$R'_2 = 10^{-6}/(C_2 \ast 10^3)$ (kΩ),
$C_2 = C_{2-estim}$ (F),
$I_{R2max} = 4.6/R_2$ (mA) [where $I_{R2max} \leq 30$ mA]
where $I_{R2max}$ is the maximum current to be passed through resistor 304 for zone 2; and where $C_{2-estim}$ is the estimated value of capacitance inside I²C bus expansion circuit 204.

In Zone-3:
$R_3 = 10^{-6}/(C_3 \ast 10^3)$ (kΩ),
$C_3 = C_{3-ici} + C_{3-icw} + C_{3-expd}$ (F),
$C_{3-ici/icw} = (IC\ No.)_{Z-3} \ast C_{ic-input/wiring}$ (F)
where $C_{3-ici}$ is the capacitance contributed by the input of devices 1–N for zone 3; $C_{3-icw}$ is the capacitance contributed by the wiring of devices 1–N for zone 3; $C_{3-expd}$ is the capacitance contributed by I²C bus expansion circuit 204 for zone 3; and $(IC\ No.)_{Z-3}$ is the total number of ICs for zone 3.

In the present embodiment, as seen by single main system microprocessor 202, one I²C bus expansion circuit is equivalent to one conventional component in terms of input capacitance (e.g. 5–10 pF). Hence, the present embodiment increases the maximum number of components controlled by single main system microprocessor 202 by at least 5 times over the prior art.

Figure 4:
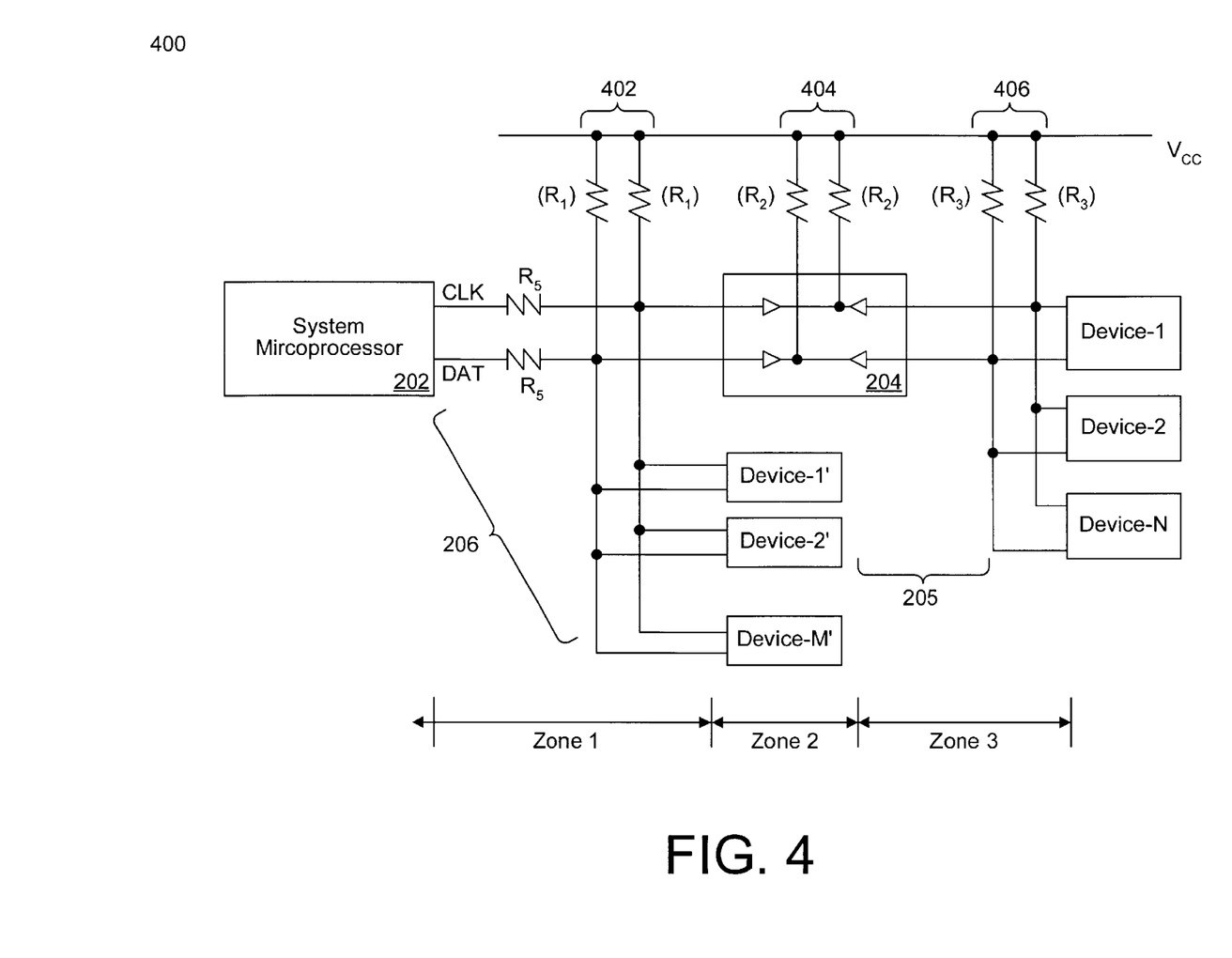
FIG. 4 is a schematic diagram of an embodiment in which multiple components are directly connected to a bus coupling an impedance isolating expansion circuit and a single main system microprocessor in accordance with one embodiment of the present claimed invention.

Referring next to FIG. 4, a simplified schematic view of another embodiment of the present invention is shown in which a single main system microprocessor 202 is coupled to I²C bus expansion circuit 204 via I²C bus 206. Furthermore, in the embodiment of FIG. 4, additional components (i.e. devices 1'–M') other than I²C bus expansion circuit 204 are directly coupled to I²C bus 206. In the embodiment of FIG. 4, three pull-up resistors 402, 404, and 406 are shown coupled to I²C bus 206, I²C bus expansion circuit 204, and I²C bus 205, respectively. Once again, in the present embodiment, the values for resistors 402, 404, and 406 must be properly selected. That is, resistors 402, 404, and 406 must be of a value such that such that the required time-constants on I²C buses 205 and 206 and on I²C bus expansion circuit 204 can be guaranteed.

The following discussion presents, in detail, one method for deriving the appropriate values for resistors 402, 404, and 406. As in the embodiment of FIG. 3, system 400 of FIG. 4 is partitioned into three zones to clarify the resistor value calculations for the present embodiment. Zone 1 includes capacitance values associated with single main system microprocessor 202, the components coupled thereto (i.e. devices 1'–M'), and I²C bus 206; Zone 2 includes capacitance values associated with circuitry inside I²C bus expansion circuit 204; and Zone 3 includes capacitance values associated with I²C bus 205 and the components coupled thereto (i.e. devices 1–N). In the following calculations, the input capacitance associated with devices 1–N and 1'–M' is estimated to be, on average, 5–10 pF. Additionally, $C_1$ refers to the capacitance present on I²C bus 206. Thus, the calculations for $R_1$, $R_2$, and $R_3$ in system 400 are as follows:

In Zone-1:
$R_1 = 10^{-6}/(C_1 \ast 10^3)$ (kΩ),
$C_1 = C_{1-mci} + C_{1-mcw} + C_{1-ici} + C_{1-icw} + C_{1-expd}$ (F)
$C_{1-ici/icw} = (IC\ No.)_{Z-1} \ast C_{ic-input/wiring}$ (F)

where $C_{1-mci}$ is the capacitance contributed by the input of single main system microprocessor 202 for zone 1; $C_{1-mcw}$ is the capacitance contributed by the wiring of single main system microprocessor 202 for zone 1; $C_{1-ici}$ is the capacitance contributed by the input of devices 1'-M' for zone 1; $C_{1-icw}$ is the capacitance contributed by the wiring of devices 1'-M' for zone 1; $C_{1-expd}$ is the capacitance contributed by I²C bus expansion circuit 204 for zone 3; $C_{ic-imput/wiring}$ is the capacitance contributed by the input and by the wiring of devices 1'-M' for zone 1; and (IC No.)$_{Z-1}$ is the total number of ICs for zone 1.

In Zone-2:

$R_2 = 1/(1/R'_2 + 10*(1/R_1 + 1/R_3))$ (kΩ), $R'_2 = 10^{-6}/(C_2 * 10^3)$ (kΩ), $C_2 = C_{2-estim}$ (F), $I_{R2max} = 4.6/R_2$ (mA) [where $I_{R2max} \leq 30$ mA]

where $I_{R2max}$ is the maximum current to be passed through resistor 404 for zone 2; and where $C_{2-estim}$ is the estimated value of capacitance inside I²C bus expansion circuit 204.

In Zone-3:

$R_3 = 10^{-6}/(C_3 * 10^3)$ (kΩ), $C_3 = C_{3-ici} + C_{3-icw} + C_{3-expd}$ (F), $C_{3-ici/icw} = (IC\ No.)_{Z-3} * C_{ic-input/wiring}$ (F)

where $C_{3-ici}$ is the capacitance contributed by the input of devices 1–N for zone 3; $C_{3-icw}$ is the capacitance contributed by the wiring of devices 1–N for zone 3; $C_{3-expd}$ is the capacitance contributed by I²C bus expansion circuit 204 for zone 3; and $C_{ic-input/wiring}$ is the capacitance contributed by the input and by the wiring of devices 1–N for zone 3; and (IC No.)$_{Z-3}$ is the total number of ICs for zone 3.

In the embodiment of FIG. 4, some components (e.g. devices 1'-M') are directly controlled while other components (e.g. devices 1–N) are buffered through I²C bus expansion circuit 204. In one such embodiment, 7 components were coupled directly to I²C bus 206 while an additional 17 devices were coupled to I²C bus expansion circuit 204. Hence, the present embodiment fully utilizes the existing driving capabilities of single main system microprocessor 202 while, at the same time, reducing power consumption to a minimum.

Figure 5A:
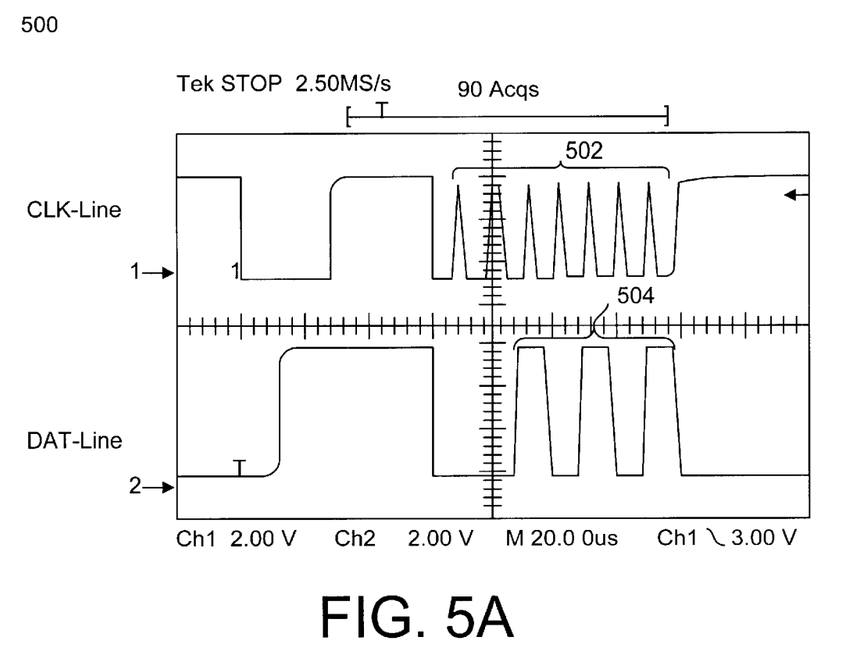
FIG. 5A is a graph illustrating signal distortion associated with a conventional single processor controlled device.
Figure 5B:
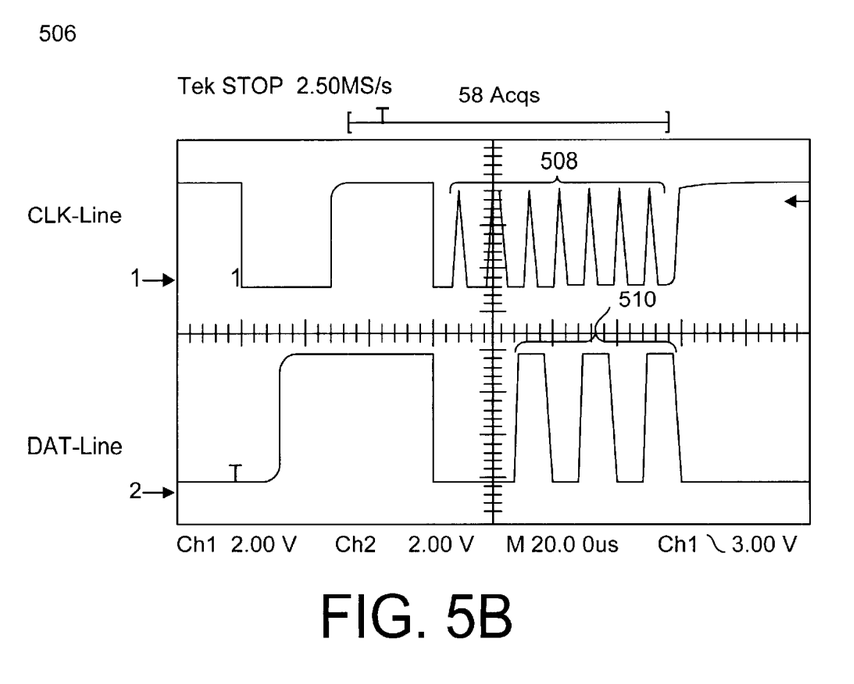
FIG. 5B is a graph illustrating reduced-distortion control and data signals generated in accordance with one embodiment of the present claimed invention.

Referring now to FIGS. 5A and 5B, graphs illustrating benefits associated with the present invention are shown. FIG. 5A illustrates clock (CLK) and data (DAT) waveforms measured from an I²C bus of a prior art single microprocessor system. In the prior art device used to generate graph 500, a total of 23 components were controlled directly by the single microprocessor. As shown in FIG. 5A, wave peaks 502 and 504 are not square waveforms as was desired. That is, the signal distortion associated with the prior art single microprocessor system caused the waveforms to acquire an unwanted sawtooth-like shape.

FIG. 5B illustrates clock (CLK) and data (DAT) waveforms measured from the I²C bus of one embodiment of a single main system microprocessor 202 having an impedance isolating expansion circuit 204 coupled thereto in accordance with the present invention. Once again, in this embodiment of the present invention, a total of 23 components were controlled by single main system microprocessor 202 and I²C bus expansion circuit 204. As shown in FIG. 5B, wave peaks 508 and 510 have a more square waveform as was desired. That is, the present invention eliminates much of the signal distortion associated with prior art single microprocessor systems.

Figure 6:
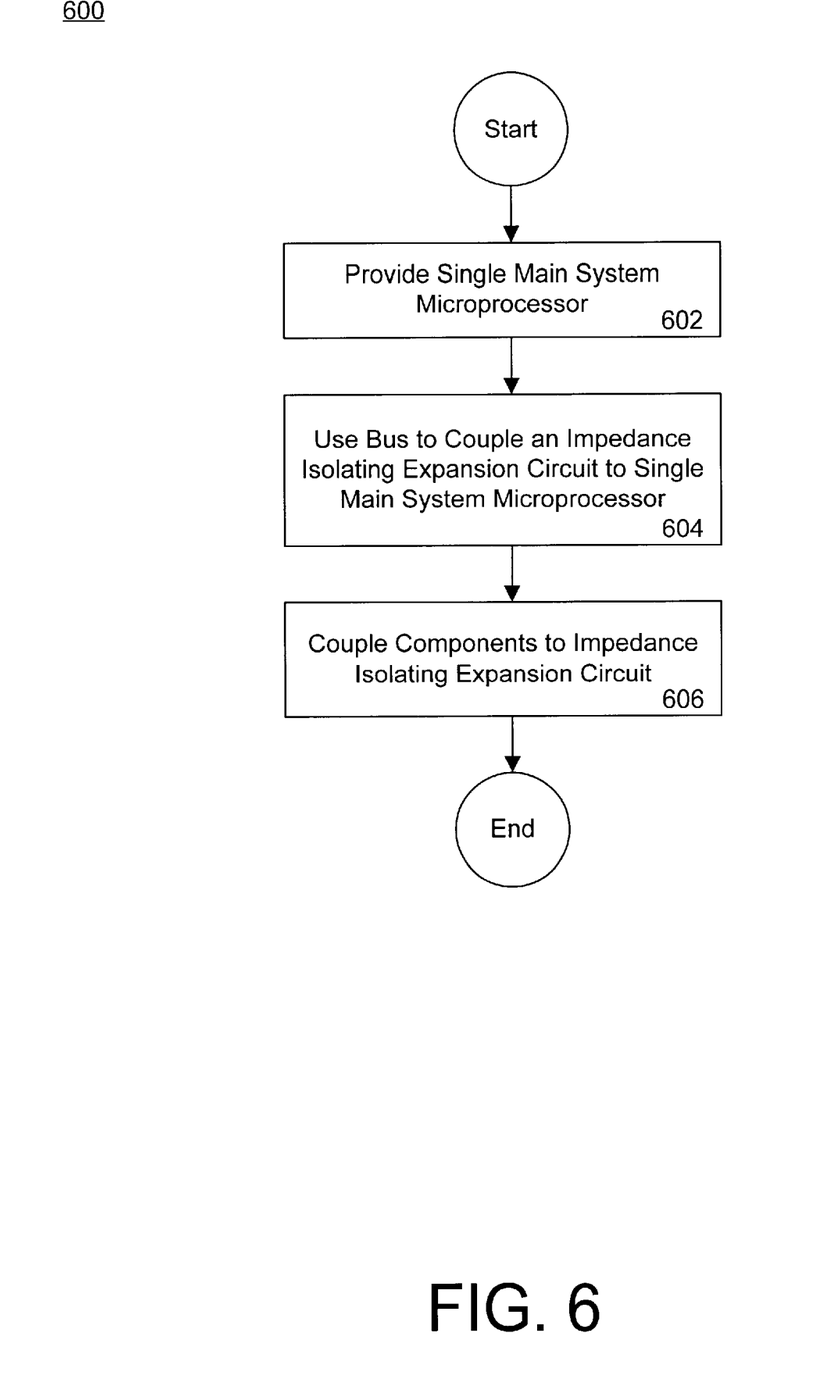
FIG. 6 is a flow chart illustrating steps performed in accordance with one embodiment of the present claimed invention.

With reference now to FIG. 6, a flow chart 600 of steps performed in accordance with one embodiment of the present invention is shown. The following steps will be described with occasional reference to the elements of FIG. 2 in order to further clarify the steps of FIG. 6. As shown in step 602, the present embodiment first provides a single main system microprocessor 202.

At step 602, the present embodiment uses a bus 206 to couple an impedance isolating expansion circuit 204 to single main system microprocessor 202. As mentioned above, in one embodiment of the present invention, bus 206 is an I²C bus. In another embodiment, additional components 240, 242, and 244 are coupled directly to bus 206.

Next, at step 604, the present embodiment couples components (e.g. components 208–238) to impedance isolating expansion circuit 204 such that components 208–238 are not directly connected to bus 206 and such that components 208–238 do not induce an impedance load on bus 206. In one embodiment, at step 604, an I²C bus 205 is used to couple components 208–238 to impedance isolating expansion circuit 204. In so doing, the present invention allows single main system microprocessor 202 to operate effectively and without severe signal distortion. As a result, a single main system microprocessor is able to control operation of a device (e.g. a TV, an HDTV, a DVD player, or other consumer electronics device) with reliability and stability even when the device includes numerous components.

Thus, the present invention provides a method and apparatus having a reduced number of system microprocessors in a device. Additionally, the present invention provides a method and apparatus which achieves the above-listed accomplishment and wherein the device does not impose prohibitively high driving requirements on the system microprocessor. The present invention further provides a method and apparatus which achieves both of the above-listed accomplishments and wherein the device does not suffer from severe signal distortion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A consumer electronics product having a reduced number of controlling system microprocessors, said consumer electronics product comprising:

a single main system microprocessor;

an impedance isolating I²C expansion circuit;

an I²C bus coupling said single main system microprocessor to said impedance isolating I²C bus expansion circuit; and a first component coupled to said impedance isolating I²C bus expansion circuit such that said first component is not directly connected to said I²C bus and such that said first component does not induce an impedance load on said I²C bus.

2. The consumer electronics product of claim 1 further comprising:

a second component coupled to said I²C bus.

3. The consumer electronics product of claim 1 further comprising:
a second bus, said second bus coupling said first component to said impedance isolating I²C bus expansion circuit.

4. The consumer electronics product of claim 3 wherein said second bus is an I²C bus.

5. The consumer electronics product of claim 1 further comprising:
a plurality of said first components coupled to said impedance isolating I²C bus expansion circuit; and
a plurality of said second components coupled to said I²C bus.

6. The consumer electronics product of claim 1 wherein said consumer electronics product is a high definition television (HDTV) system.

7. The consumer electronics product of claim 1 wherein said consumer electronics product is a digital video disc (DVD) system.

8. A method for controlling a consumer electronics product using a single main system microprocessor, said method comprising the steps of:
a) providing a single main system microprocessor
b) using an I²C bus to couple an impedance isolating I²C expansion circuit to said single main system microprocessor; and
c) coupling a first component to said impedance isolating I²C expansion circuit such that said first component is not directly connected to said I²C bus and such that said first component does not induce a direct impedance load on said I²C bus.

9. The method for controlling a consumer electronics product using a single main system microprocessor as recited in claim 8, wherein step c) comprises:
using a second I²C bus to couple said first component to said impedance isolating I²C expansion circuit.

10. The method for controlling a consumer electronics product using a single main system microprocessor as recited in claim 8, wherein step c) comprises:
coupling a plurality of said first components to said impedance isolating I²C expansion circuit.

11. The method for controlling a consumer electronics product using a single main system microprocessor as recited in claim 8, further comprising the step of:
d) coupling a second component to said I²C bus.

12. The method for controlling a consumer electronics product using a single main system microprocessor as recited in claim 11, wherein step d) comprises:
coupling a plurality of said second components to said I²C bus.

13. The method for controlling a consumer electronics product using a single main system microprocessor as recited in claim 8, wherein said consumer electronics product is a high definition television (HDTV) system.

14. The method for controlling a consumer electronics product using a single main system microprocessor as recited in claim 8, wherein said consumer electronics product is a digital video disc (DVD) system.

15. A consumer electronics product having a reduced number of controlling system microprocessors, said consumer electronics product comprising:
single main processing means for controlling operation of said consumer electronics product;
I²C bus expansion circuit means for isolating impedance,
I²C bus means for coupling said single main processing means to said I²C bus expansion circuit means for isolating impedance;
a first component coupled to said I²C bus expansion circuit means for isolating impedance such that said first component is not directly connected to said I²C bus means and such that said first component does not induce a direct impedance load on said I²C bus means.

16. The consumer electronics product of claim 15 further comprising:
second bus means for coupling said first component to said I²C bus expansion circuit means for isolating impedance.

17. The consumer electronics product of claim 16 wherein said second bus means is comprised of an I²C bus.

18. The consumer electronics product of claim 15 further comprising:
a second component coupled to said I²C bus means.

19. The consumer electronics product of claim 15 further comprising:
a plurality of said first components coupled to said I²C bus expansion circuit means for isolating impedance; and
a plurality of second components coupled to said I²C bus means.

20. The consumer electronics product of claim 15 wherein said consumer electronics product is a high definition television (HDTV) system.

21. The consumer electronics product of claim 15 wherein said consumer electronics product is a digital video disc (DVD) system.

* * * * *